(12) United States Patent
Pederson

(10) Patent No.: US 6,276,301 B1
(45) Date of Patent: Aug. 21, 2001

(54) FISH HABITAT STRUCTURE

(76) Inventor: Les H. Pederson, 4444 S. York St., Sioux City, IA (US) 51106

( * ) Notice: Subject to any disclaimer, the term of this patent is extended or adjusted under 35 U.S.C. 154(b) by 0 days.

(21) Appl. No.: 09/414,570

(22) Filed: Oct. 8, 1999

(51) Int. Cl.[7] .............................. A01K 61/00; E02B 3/04
(52) U.S. Cl. .............................................. 119/222; 405/15
(58) Field of Search .................................. 119/219, 221, 119/222; 405/15, 21, 23, 25

(56) References Cited

U.S. PATENT DOCUMENTS

| | | | |
|---|---|---|---|
| 3,933,124 | * | 1/1976 | Ledoux et al. .................... 405/23 |
| 4,196,694 | * | 4/1980 | Buchanan ........................ 119/222 |
| 5,213,058 | * | 5/1993 | Parker et al. .................... 119/222 |
| 5,238,325 | * | 8/1993 | Krenzler ........................... 405/15 |
| 5,370,476 | * | 12/1994 | Streichenberger ................ 405/15 |
| 5,807,023 | * | 9/1998 | Krenzler ........................ 119/222 |
| 6,042,300 | * | 3/2000 | Walter ............................ 119/221 |

* cited by examiner

Primary Examiner—Charles T. Jordan
Assistant Examiner—Elizabeth Shaw
(74) Attorney, Agent, or Firm—Zarley, McKee, Thomte, Voorhees & Sease

(57) ABSTRACT

A fish habitat package built up of old tire casings baled together to form a series of chambers into which fish can enter to provide habitat for those fish.

18 Claims, 2 Drawing Sheets

FISH HABITAT STRUCTURE

BACKGROUND AND SUMMARY OF THE INVENTION

This invention pertains to fish habitat structures, and more particularly to a structure formed from used tire casings held together in a form which can be submerged in a fish related environment and which then will provide chambers into which fish can swim and be concealed or protected.

In many instances, currently both in artificially created fishing ponds formed by dams in streams or formed by excavations below a groundwater line, and also in streams which have been cleared or straightened to provide enhanced drainage, fish are not provided with natural submerged objects to provide habitat. Such matters as submerged trees or exposed tree roots and the like are simply not available. The growth of fish population is not encouraged by such clearing, and use of the pond or stream as a recreational facility is greatly lessened.

Artificial structures to provide underwater habitat are becoming more common. Such structures as wooden crates have been used, and even old auto bodies have been suggested to serve the purpose.

By the present invention, applicant proposes to assemble a structure from used auto tire casings in a particular assembly which will provide excellent shelter for fish and be ecologically sound. Additionally, the materials used in the structure are waste material, usually difficult to dispose of so that use of such structure provides both the benefit of better recreation as well as a disposal resource for at least a limited amount of the otherwise waste material.

DESCRIPTION

Briefly this invention comprises a structure having a plurality of chambers formed in the structure. The chambers are useful for the accommodation of fish when the structure is immersed in a body of water containing fish and may thus form a useful protective environment for the fish in a place where other cover may have been removed or is otherwise lacking.

Figure 1:
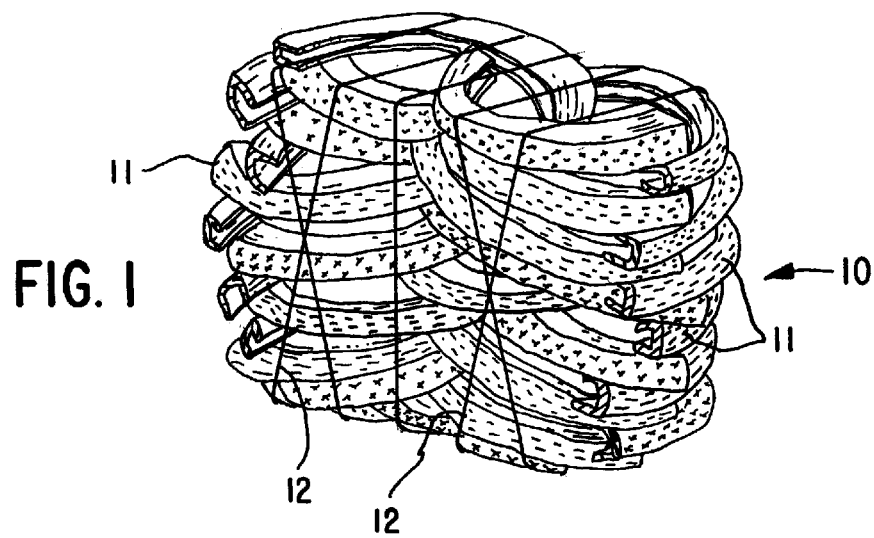
FIG. 1 is a perspective view of the entire structure.

More specifically, the structure of the habitat device is shown in the figures. Primarily the structure is a bale-like assembly of a series of used pneumatic tire casings. The unique feature is the mode of inter-linking of the casings. The bale-like structure 10 is best shown in FIG. 1 where the casings 11 are shown stacked in two apparent stacks and bound by a wire 12 or other confinement means. The appearance is somewhat deceiving.

Figure 2:
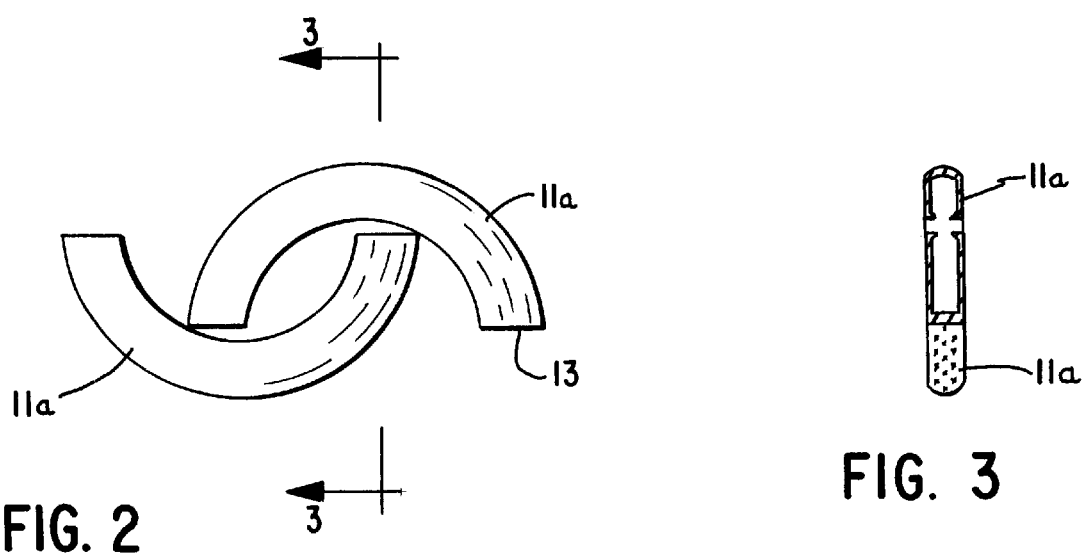
FIG. 2 is a top view of the layers of material immediately below the top layer.
Figure 3:
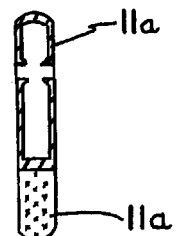
FIG. 3 is a sectional view from line 3—3 of FIG. 2.

In fact the stacks are principally formed of casings cut diametrically into two half casings 11a (FIG. 2) and inter-linked as shown in one layer and then reversed in an adjacent layer so that the open end 13 of the casing on the right side in the drawing will extend opposite the open end of a half casing in the next layer. This stacking is somewhat better shown in FIG. 4.

At the top and the bottom of the stack are full casings 14. These serve to hold in place the fractional casings used in the rest of the stack, but are not as conducive as partial casings to the providing of openings into which the fish may go for protection. For added stabilization, it is preferred to use a stabilizing layer 15 at occasional intervals in the stack.

It has been found that in a total stack of about 20 layers of half casings 11a, a simple stabilizing layer 15 will probably hold the bale in form. Larger stacks or more severe conditions of water currents or the like might require several layers at more frequent intervals.

Figure 4:
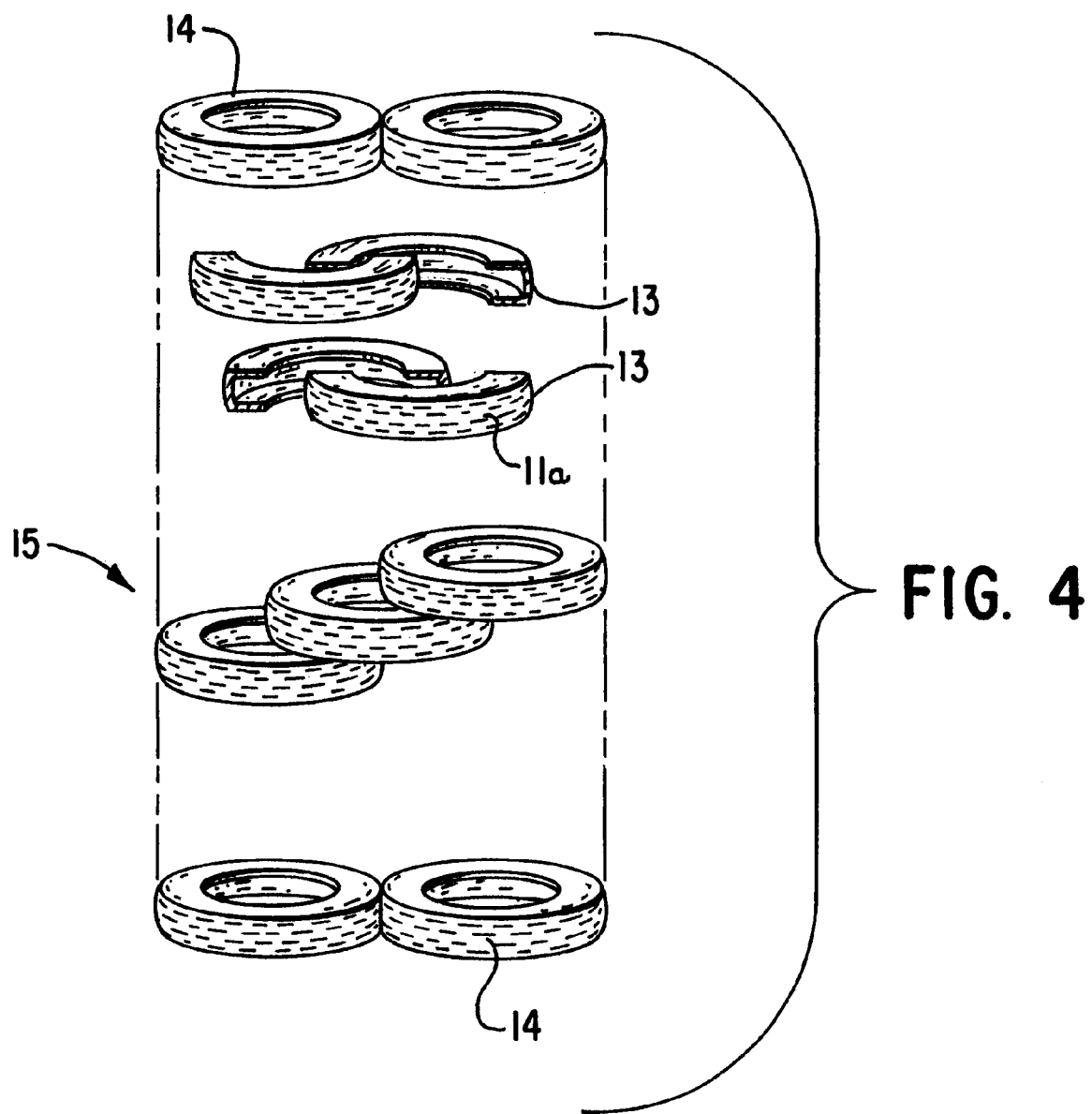
FIG. 4 is an exploded view showing the stacks as they are assembled with three different types of layers.

The stabilizing layer is preferably formed by using a plurality of casings (these complete casings in the stacks of two side-by-side half casings works well in test cases). These full casings are overlapped in a side-by-side arrangement as shown in FIG. 4 so that frictional contact of the casings within the layer and between the stabilizing layer and the adjacent layer will serve to hold the stacks in place.

The preferred structure is formed of sections of larger tires such as those used on trucks or for heavy duty use. The tires are cut diametrically and layered together as shown. The top and bottom layers and the stabilizing layer or layers are then formed of lighter weight automobile tire casings so that those layers do not extend greatly beyond the boundaries of the stacks. The different stiffness of the casings also provides for greater collapse of the lighter casings in the top, bottom and stabilizing layers and the lesser collapse and therefore larger chambers in the partial casings of the regular stack material.

It will be apparent that the use of used pneumatic tire casings is suggested because of the need for disposal of such casings and therefore because of the economy involved in such use. It should be equally obvious that any toroidal shaped object of similar flexibility could be used as the basic material of the structure. The particular form desired is the multiple cavities that necessarily are formed by the particular shape of the material used.

In use, the structure is simply immersed in the water of the pond or stream. If necessary, reasonable anchors may be used to hold the structure in place where currents of the water may tend to displace it. In the normal course of events, the simple placement of the structure will be sufficient to attract fish so that no more attention will be required.

What is claimed is:

1. A fish habitat structure comprising:
    a series of layers of partitoroidal shaped pieces held together by flexible means bound around said pieces, said pieces being hollowed to provide chambers therein and being stacked atop each other;
    a bottom layer and a top layer at either end of said stacked multiple layers, said bottom and top layers being formed of full toroidal shaped members; and
    at least one stabilizing layer provided between at least one pair of adjacent layers of the partitoroidal shaped pieces and intermediate of said top and bottom layers.

2. The structure of claim 1 in which said intermediate layer is comprised of a plurality of toroidal members interlaced with each other.

3. The structure of claim 1 in which said parti-toroidal members are pneumatic tire casings diametrically cut to provide a parti-toroidal form.

4. The structure of claim 3 in which said parti-toroidal pieces within each single layer are placed with the ends of a first piece facing in the direction opposite from the ends of a second piece to form a single layer.

5. The structure of claim 3 in which each single layer is composed of a first piece and a second piece, said pieces being diametrically cut from a fully toroidal member, said pieces being radially displaced from each other within said stack so as to present open cut ends of said toroidal member.

6. The structure of claim 1 in which said parti-toroidal pieces are substantially hollow whereby fish protection chambers are formed within said layers.

7. The structure of claim 6 in which said parti-toroidal shaped pieces are formed from diametrically cut used casings of pneumatic tires.

8. The structure of claim 1 in which said flexible means includes a tie member running at least partly-diagonal of said series of layers.

9. A fish habitat structure comprising:
   a series of layers of partitoroidal shaped pieces, said pieces being formed from diametrically cut used casings of pneumatic tires held together by flexible means bound around said pieces, said pieces being substantially hollow to provide fish protection chambers therein and being stacked atop each other;
   a bottom layer and a top layer at either end of said series of layers, said bottom and top layers being formed of full toroidal shaped members of complete used casings of pneumatic tires, said complete casings being of smaller and lighter weight tires than said partitoroidal pieces; and
   at least one stabilizing layer provided between at least one pair of adjacent layers in the series of layers and intermediate of said top and bottom layers, said stabilizing layer being formed of complete used casings of pneumatic tires, said complete casings being of smaller and light weight tires than said partitoroidal pieces.

10. A fish habitat structure comprising:
    a plurality of tires cut in half to define edges, the plurality of tires being baled together to form multiple cavities for fish shelter;
    a bottom layer of whole tires below the stacked cut tires;
    a top layer of whole tires above the stacked cut tires; and
    intermediate layers of whole tires between the top layer and bottom layer.

11. The fish habitat structure of claim 10 wherein laterally adjacent cut tires are disposed oppositely to one another so that the respective cut ends face in opposite directions.

12. The fish habitat structure of claim 10 wherein the cut ends of laterally adjacent tires overlap one another.

13. The fish habitat structure of claim 10 wherein the cut tires are arranged adjacent one another and stacked above one another.

14. A fish habitat structure, comprising:
    a plurality of C-shaped members made from tires cut in half, with each member having opposite ends;
    the members being stacked in layers; and
    baling means extending around the members to bale the members together.

15. The fish habitat structure of claim 14 wherein the ends of laterally adjacent members within a layer face in opposite directions.

16. The fish habitat structure of claim 14 wherein the ends of laterally adjacent members in a layer overlap one another.

17. The fish habitat structure of claim 14 wherein vertically adjacent members face in opposite directions.

18. The fish habitat structure of claim 17, wherein the C-shaped members are oriented substantially horizontally.

* * * * *